US012218967B2

(12) United States Patent
Matsui

(10) Patent No.: US 12,218,967 B2
(45) Date of Patent: Feb. 4, 2025

(54) CONTROL DEVICE AND CONTROL METHOD

(71) Applicant: Mitsubishi Electric Corporation, Tokyo (JP)

(72) Inventor: Toshinori Matsui, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 250 days.

(21) Appl. No.: 17/796,382

(22) PCT Filed: Apr. 10, 2020

(86) PCT No.: PCT/JP2020/016073
§ 371 (c)(1),
(2) Date: Jul. 29, 2022

(87) PCT Pub. No.: WO2021/205633
PCT Pub. Date: Oct. 14, 2021

(65) Prior Publication Data
US 2023/0344859 A1 Oct. 26, 2023

(51) Int. Cl.
*H04L 9/40* (2022.01)
*G06F 21/55* (2013.01)

(52) U.S. Cl.
CPC .......... *H04L 63/1441* (2013.01); *G06F 21/55* (2013.01)

(58) Field of Classification Search
CPC ............. H04L 63/1433; H04L 63/1441; H04L 63/145; G06F 21/55
USPC ...................................................... 726/22–25
See application file for complete search history.

(56) References Cited

U.S. PATENT DOCUMENTS

| 10,848,271 | B2 * | 11/2020 | Amimoto | .............. H04L 1/0056 |
| 2021/0155270 | A1 | 5/2021 | Morita et al. | |
| 2021/0281594 | A1 * | 9/2021 | Mizunuma | .......... H04L 63/1441 |
| 2022/0329611 | A1 * | 10/2022 | Ushio | ................. H04L 63/1441 |
| 2022/0385553 | A1 * | 12/2022 | Adachi | ................... H04L 69/40 |

(Continued)

FOREIGN PATENT DOCUMENTS

JP      2018-194909 A     12/2018

OTHER PUBLICATIONS

International Search Report for PCT/JP2020/016073 dated Jul. 21, 2020.

*Primary Examiner* — Bharat Barot
(74) *Attorney, Agent, or Firm* — Sughrue Mion, PLLC

(57) ABSTRACT

Provided are a functional element holder to hold a plurality of functional elements for executing the control and also backup functional elements, an abnormality detector to detect an abnormality caused by a security attack via the communication network, a processing target identifying circuitry to identify, as processing targets, a functional element in which the abnormality is detected and a related functional element related to the abnormality among the plurality of functional elements, and a functional element switcher to switch control functions of the functional elements identified as the processing targets to corresponding respective backup functional elements to cause an execution. The processing target identifying circuitry is configured to extract, as the related functional element, a functional element that is determined to have an operating status having a similarity to that of the functional element in which the abnormality is detected.

20 Claims, 8 Drawing Sheets

(56) References Cited

U.S. PATENT DOCUMENTS

2023/0339496 A1\* 10/2023 Yamashita ........... G06Q 10/047
2024/0010163 A1\* 1/2024 Toyooka ............. B60R 16/0231

\* cited by examiner

CONTROL DEVICE AND CONTROL METHOD

CROSS REFERENCE TO RELATED APPLICATIONS

This application is a National Stage of International Application No. PCT/JP2020/016073 filed Apr. 10, 2020.

TECHNICAL FIELD

The present application relates to a control device and a control method.

BACKGROUND ART

In general, a control device called an electronic control unit (ECU) is installed in a plural number in a vehicle, and each control device is connected to another ECU or a communication device outside the vehicle by wire or wireless. Therefore, due to an illegal intrusion inside by a security attack via a communication line, program data may be falsified, thereby causing a problem in the running control of the vehicle.

To deal with the above, there is an information processing device disclosed in which, when an abnormality occurs due to a security attack, a source of occurrence of the abnormality and an affected location are identified to switch to an operation mode that can be used even if the abnormality occurs and the running control of the vehicle is continued (for example, refer to Patent Document 1).

CITATION LIST

Patent Document

Patent Document 1: Japanese Unexamined Patent Application Publication No. 2018-194909 (Paragraphs 0015 to 0103, FIG. 1 to FIG. 9)

SUMMARY OF INVENTION

Problems to be Solved by Invention

However, while the above-described countermeasure can be taken when the relationship between the source of occurrence of the abnormality and the affected location due to the security attack can be analyzed in advance, it is difficult to cope with an unknown security attack in which the relationship is unknown.

The present application discloses a technique for solving the above-described problem, and an object thereof is to obtain a control device that can continue vehicle control even if a vehicle is subject to an unknown security attack that is difficult to be analyzed in advance and affects vehicle control.

Means for Solving Problems

A control device disclosed in the present application is a control device that controls a device mounted on a vehicle via a communication network, and comprises a functional element holding unit to hold a plurality of functional elements for executing the control and also backup functional elements that correspond to the plurality of respective functional elements and are capable of executing the same control as the respective functional elements, an abnormality detection unit to detect an abnormality caused by a security attack via the communication network, a processing target identifying unit to identify, as processing targets, a functional element in which the abnormality is detected and a related functional element related to the abnormality among the plurality of functional elements when the abnormality is detected, and a functional element switching unit to switch control functions of the functional elements identified as the processing targets to corresponding respective backup functional elements to cause an execution. The processing target identifying unit extracts, as the related functional element, a functional element that is determined to have an operating status having a similarity to that of the functional element in which the abnormality is detected based on an operation history of the plurality of functional elements.

A control method disclosed in the present application is a method for controlling a device mounted in a vehicle via a communication network, and comprises a functional element holding step of holding a plurality of functional elements for executing the control and also backup functional elements that correspond to the plurality of respective functional elements and are capable of executing the same control as the respective functional elements, an abnormality detecting step of detecting an abnormality caused by a security attack via the communication network, a processing target identifying step of identifying, as processing targets, a functional element in which the abnormality is detected and a related functional element related to the abnormality among the plurality of functional elements when the abnormality is detected, and a functional element switching step of switching control functions of the functional elements identified as the processing targets to corresponding respective backup functional elements to cause an execution. In the processing target identifying step, a functional element that is determined to have an operating status having a similarity to that of the functional element in which the abnormality is detected is extracted as the related functional element based on an operation history of the plurality of functional elements.

Effect of Invention

According to the control device or control method disclosed in the present application, since a functional element related to a functional element in which an abnormality has occurred is identified from the similarity of operating statuses of functional elements used for vehicle control and a countermeasure is taken, vehicle control can be continued even if the vehicle is subject to an unknown security attack that is difficult to be analyzed in advance.

MODES FOR CARRYING OUT INVENTION

Embodiment 1

Figure 1:
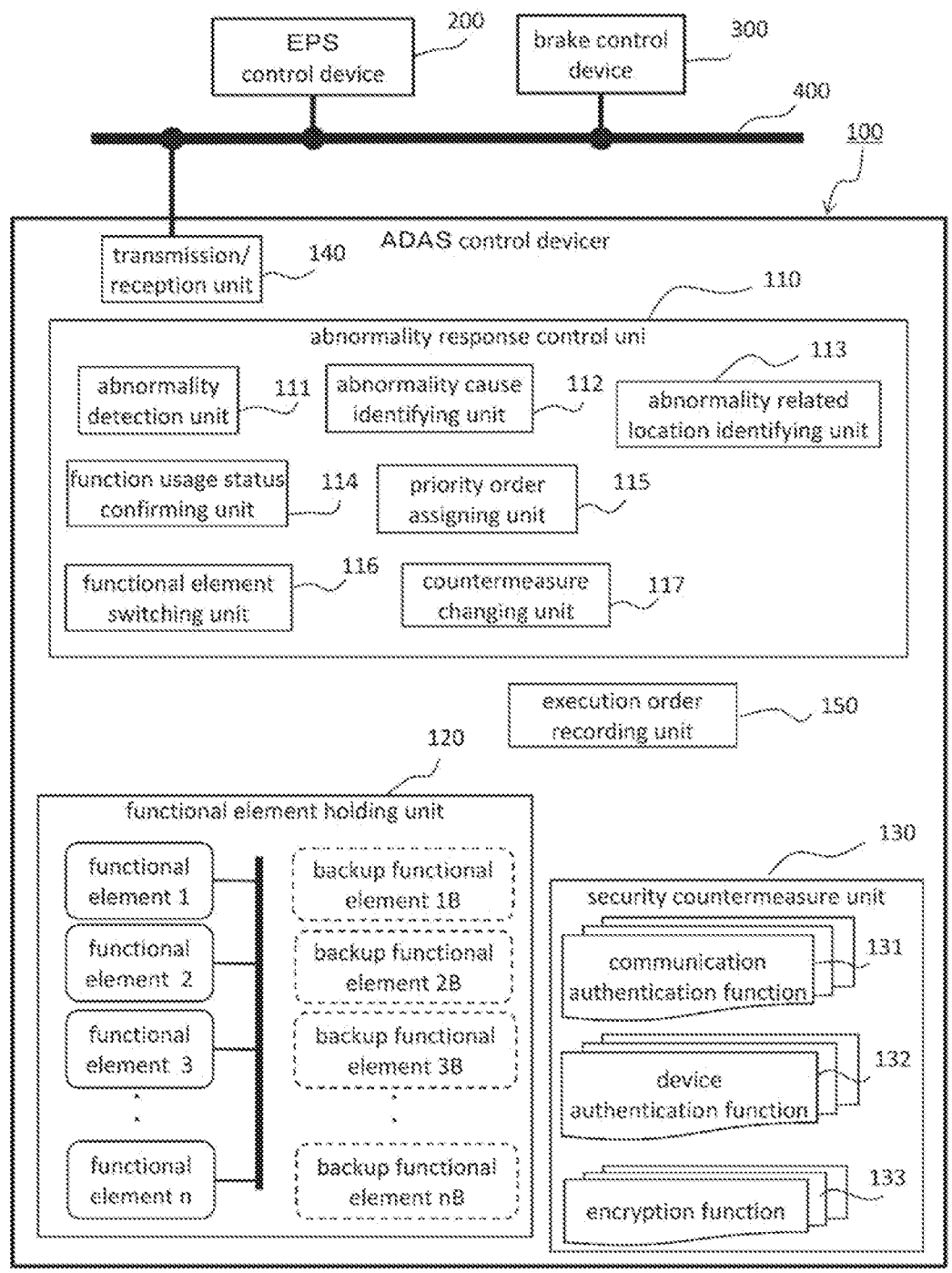
FIG. 1 is a block diagram for explaining a configuration of a control device according to Embodiment 1.
Figure 2:
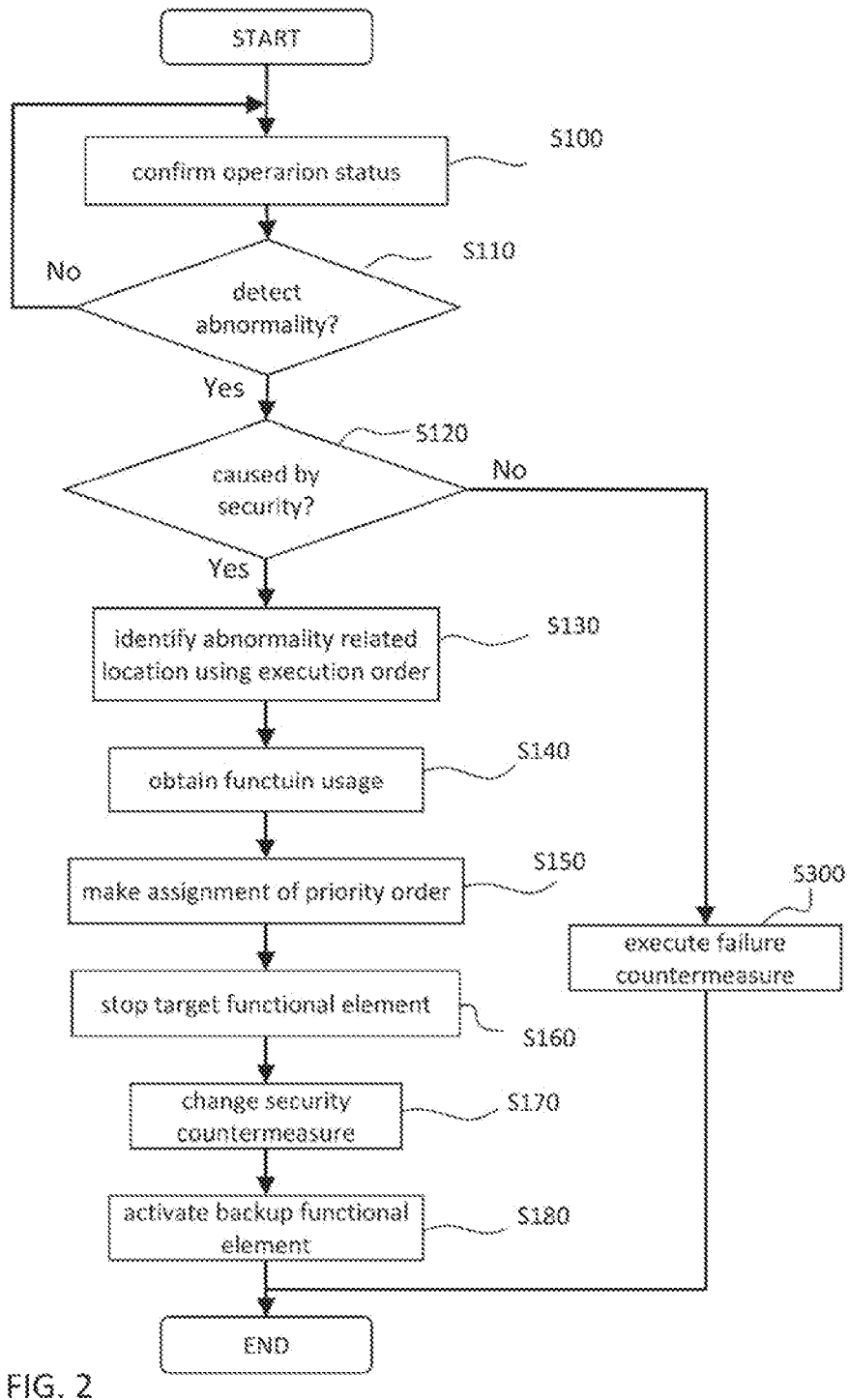
FIG. 2 is a flowchart for explaining operations of the control device according to Embodiment 1.
Figure 3:
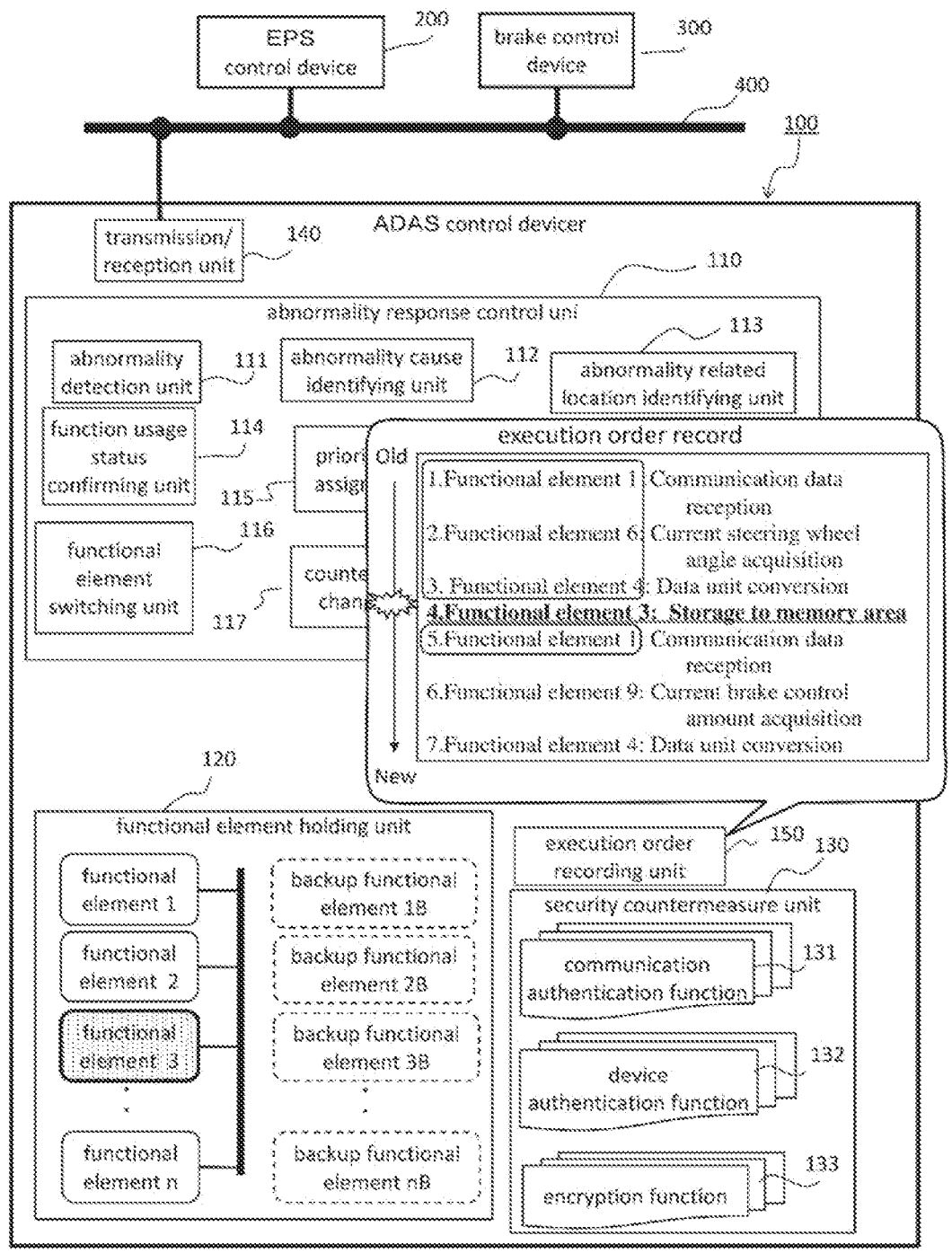
FIG. 3 is a block diagram showing a functional element in which an abnormality has occurred in the configuration of the control device according to Embodiment 1.

FIG. 1 to FIG. 3 are diagrams for explaining a configuration and operations of a control device according to Embodiment 1, FIG. 1 is a block diagram of the control device in which a connection with other control devices via a communication path is contained in the configuration of the control device, and FIG. 2 is a flowchart for explaining a countermeasure operation when a security attack is received, namely, a control method. FIG. 3 is a block diagram, which corresponds to FIG. 1, for showing a functional element in which an abnormality has occurred for identifying abnormality related locations among a plurality of functional elements held in the functional element holding unit of the control device, and for showing recorded contents of an execution order recording unit.

As described in the background art, the control device to control a vehicle is configured such that each of electronic control units called ECU is connected to another ECU or a communication device outside the vehicle by wire or wireless. Among the control devices, a control device according to Embodiment 1 called an advanced driver assistance system (ADAS) will be described as an example.

As shown in FIG. 1, the control device (ADAS control device 100) according to Embodiment 1 is connected to other control devices such as an EPS control device 200 and a brake control device 300 via an in-vehicle network 400. For example, the EPS control device 200 controls an angle and a torque, etc. of an electric power steering, and the brake control device 300 controls a control amount, etc. of a brake. The vehicle control system shown actually includes components not shown in FIG. 1, and descriptions thereof are omitted for those not directly related to the description of Embodiment 1.

The ADAS control device 100 determines a situation in the vehicle or of a relationship with other vehicles on the basis of a value of it's own sensor (not shown) and an input value obtained from the other control devices via the in-vehicle network 400. Then, for example, the EPS control device 200 and the brake control device 300 are instructed with respect to the control amounts such as an angle and a torque, etc. and with respect to control amounts of the brake, etc. respectively.

As the in-vehicle network 400, a controller area network (CAN: registered trademark), an Ethernet (registered trademark), or the like, which serves as a communication path for communicating with the inside and outside of the vehicle, is generally used, but is not limited thereto.

The ADAS control device 100 is provided with a transmission/reception unit 140 that performs transmission/reception with other devices, a functional element holding unit 120 that holds a plurality of functional elements i for controlling the vehicle and the other devices, a security countermeasure unit 130 that performs security countermeasures, an abnormality response control unit 110 that handles an abnormality, and an execution order recording unit 150 that records an execution order of the functional elements i. Each of the components and the function thereof will be briefly described below.

The transmission/reception unit 140 performs data transmission/reception by communication with the other control devices connected via the in-vehicle network 400 (here, EPS control device 200 and brake control device 300 are mentioned, but not limited thereto) or with a device outside the vehicle.

The functional element holding unit 120 holds a plurality of functional elements: Functional element 1, Functional element 2, Functional element 3, . . . , Functional element n for calculating control amounts related to the control of the EPS control device 200 and the brake control device 300 or various processing values. In addition, Backup functional element 1B having the same control function as that of Functional element 1, Backup functional element 2B having the same control function as that of Functional element 2, Backup functional element 3B having the same control function as that of Functional element 3, and Backup functional element nB having the same control function as that of Functional element n are held as backups. That is, an element having the same control function with respect to a certain functional element i is held as a backup functional element iB.

Here, in the description, it is assumed that the following functions are assigned to the functional elements 1 to n(13) but these are not all and are not limited thereto. Note that the classification for the functional elements is written in parenthesis.

Functional element 1: Communication data reception (common function)

Functional element 2: Communication data transmission (common function)

Functional element 3: Storage to memory area (common function)

Functional element 4: Reading from memory area (common function)

Functional element 5: Data unit conversion (common function)

Functional element 6: Current steering wheel angle acquisition (function related to steering operation)

Functional element 7: Target steering wheel angle derivation (function related to steering operation)

Functional element 8: Current vehicle speed acquisition (function related to brake operation)

Functional element 9: Current brake control amount acquisition (function related to brake operation)

Functional element 10: Current yaw rate acquisition (function related to steering operation)

Functional element 11: Target yaw rate derivation (function related to steering operation)

Functional element 12: Target vehicle speed derivation (function related to brake operation)

Functional element 13: Target brake control amount derivation (function related to brake operation)

The security countermeasure unit 130 holds a function for securing security resistance of the ADAS control device 100. Here, a communication authentication function 131 as a countermeasure against spoofing of a communication message, a device authentication function 132 as a countermeasure against spoofing of a connected device, and an encryption function 133 for securing confidentiality of data to be transmitted and confidentiality of data to be stored in a control device, etc. are stated.

The execution order recording unit 150 records an execution order as an operation history for determining a similarity in the functional element i. A memory area for recording the execution order of a certain amount is secured, and for example, processing is sequentially overwritten from the oldest one, which is called first in first out (FIFO), so that it is possible to record the processing order of the functional element i of a predetermined number of times most recently performed.

The abnormality response control unit 110 is provided with an abnormality detection unit 111 that detects an abnormality by checking the operating statuses of devices in the vehicle, an abnormality cause identifying unit 112 that determines whether or not the abnormality is caused by a security attack, and an abnormality related location identification unit 113 that identifies a functional element i related to the abnormality to make it a processing target. A function usage status confirming unit 114 for detecting the usage status of a functional element i in the vehicle and a priority order assigning unit 115 for assigning a priority order as a processing target to the functional element i identified as the abnormality related location in accordance with the detected usage status of the functional element i are provided. Further, a functional element switching unit 116 for controlling stopping or switching, etc. of the functional element i in the functional element holding unit 120 according to the determined priority order, and a countermeasure changing unit 117 for changing a security countermeasure function in the security countermeasure unit 130 are provided.

The abnormality detection unit 111 collects information on the operating status of each device in the vehicle and detects a failure occurring in the vehicle and an abnormality caused by a security attack from the collected information. Here, as the data related to the abnormality, a change in a memory, an operation, an output value, and the like that are different from the ordinary can be considered. Subjects for the collection includes not only its own device (in ADAS control device 100) but also other control devices (such as EPS control device 200 and brake control device 300) via the in-vehicle network 400.

The abnormality cause identifying unit 112 identifies the type of abnormality, such as whether the abnormality is caused by a failure or a security attack, on the basis of the information indicating the abnormality, which is included in the information confirmed by the abnormality detection unit 111.

When the abnormality cause identifying unit 112 identifies that the abnormality is caused by a security attack, the abnormality related location identifying unit 113 identifies functional elements i related to the abnormality from the execution order of the functional elements i recorded in the execution order recording unit 150. For example, with respect to functional elements i executed when an abnormality is detected, it is determined that a functional element i, two functional elements i executed immediately before the functional element i, and one functional element i executed immediately after the functional element i have a high degree of similarity in operating conditions, and they are set to be identified as abnormality related locations.

At this time, if the execution order recorded in the execution order recording unit 150 immediately before when the abnormality is detected is assumed to be in the following order: Functional element 1→Functional element 2→Functional element 3 (abnormality is detected here)→Functional element 4, then Functional elements 1 to 2, 3, and 4 are identified as functional elements i related to the abnormality. As described above, as an analysis of the control device at the time of the abnormality detection, the order of the recorded functional elements i is confirmed, functional elements i being close in order are determined to have similarity in the operations, and functional elements i (abnormality related locations) related to the abnormality are identified.

The function usage status confirming unit 114 collects information on the status of each control device in the vehicle, e.g., a vehicle operation such as steering frequency, or on the usage statuses of the functional elements i with respect to the vehicle control, and confirms the usage statuses of functional elements i.

The priority order assigning unit 115 assigns a priority order as processing targets to the functional element i as the source of occurrence identified by the abnormality cause identifying unit 112 and the functional elements i as the affected locations by the abnormality related location identifying unit 113 in accordance with the function usage statuses confirmed by the function usage status confirming unit 114.

The functional element switching unit 116 switches the functional elements i related to the abnormality identified as the abnormality related locations to the backup functional elements iB on the basis of the priority order assigned by the priority order assigning unit 115. Here, among the plurality of functional elements i included in the functional element holding unit 120. Functional element 1 is to be switched to Backup functional element 1B, Functional element 2 is to be switched to Backup functional element 2B, Functional element 3 is to be switched to Backup functional element 3B, and Functional element n is to be switched to Backup functional element nB.

The countermeasure changing unit 117 changes the security countermeasure function managed by the security countermeasure unit 130 so as to improve the security resistance. For example, the communication authentication function 131 transmits a message authentication code (MAC) calculated from communication data together with a communication message in order to prevent spoofing of the communication message. Here, for example, in order to improve the security resistance, the length of the MAC may be made longer than usual. With respect to other functions included in the security countermeasure unit 130, the security resistance is to be improved by increasing the encryption key length of an encryption to be used, increasing the length of an authenticator, or changing an encryption algorithm itself.

Next, a series of processes, namely, a control method when an abnormality is detected by the ADAS control device 100 in the vehicle control system according to Embodiment 1 will be described with reference to the flowchart of FIG. 2.

The abnormality detection unit 111 collects information indicating operating statuses not only from the statuses (memory, input/output data, change in processing contents) in its own control device but also from the EPS control device 200, the brake control device 300 and the like via the in-vehicle network 400 (step S100).

Then, it is determined whether or not there is information indicating an abnormality in the collected information (step S110). If an abnormality is detected ("Yes"), the processing proceeds to step S120. If no abnormality is detected ("No"), the process returns to step S100, and the collection of the operating status information on the devices is continued.

When an abnormality is detected, the abnormality cause identifying unit 112 determines whether the abnormality is caused by a failure or a security attack on the basis of the collected information on the abnormality (step S120). When it is identified that the abnormality is caused by the failure ("No"), for example, a general failure countermeasure based on a fail safe operation is executed (step S300), and the processing ends.

In contrast, if it is determined that the abnormality is caused by the security attack ("Yes"), the abnormality related location identifying unit 113 identifies up to which functional elements i the abnormality is related (abnormality related locations) (step S130). Specifically, as will be described later, as an analysis of the control device based on the functional element i in which the abnormality is detected, the abnormality related locations are identified using the data of the execution order of the functional elements i recorded in the execution order recording unit 150.

Further, the function usage status confirming unit 114 obtains function usage information corresponding to the vehicle operation, the vehicle control, the vehicle state, or the surface state of a traveling road, and confirms the usage statuses of the functional elements i (step S140). Here, as an operation history, the usage statuses of a function related to a steering operation, a function related to a brake operation, and a function related to common functions such as communication are confirmed. Then, the priority order assigning unit 115 makes assignment of the priority order in accordance with the function usage statuses when functional elements i played by the functional elements i related to the abnormality are to be restored by backup functional elements iB. Within the same function, the priority order is assigned in advance (step S150), for example.

When the processing targets and the priority order are determined in step S130 to step S150, the functional element switching unit 116 stops all the functional elements i identified as the processing targets (step S160).

Subsequently, the countermeasure changing unit 117 changes the countermeasure function managed by the security countermeasure unit 130 so as to improve the security resistance (step S170). In the present embodiment, an example in which the communication authentication function 131 is changed on the assumption that a security attack is received through communication. Then, by configuring an actual change target to be selected according to the type of security attack, it is expected that the security resistance will be further improved. In addition, the transmission/reception unit 140 notifies other control devices that the security countermeasure function has been switched. However, the other control devices are not notified of the security countermeasures to be implemented only by its own control device.

Then, the functional element switching unit 116 activates the backup functional elements iB in order from the backup functional element iB corresponding to the functional element i with high priority assigned in step S150 for the functional elements i stopped in step S160, and the switching from the stopped functional elements i is performed (step S180). Thus, the processing at the time of the abnormality is completed.

In the ADAS control device 100 having the above-described configuration and the basic operating function (processing flow), an example of an operation when an abnormality caused by a certain security attack occurs will be described. As an abnormality caused by a security attack, it is assumed that an abnormality caused by falsification of Functional element 3 among the functional elements i held by the functional element holding unit 120 due to a security attack via the in-vehicle network 400 is detected as shown in FIG. 3.

In step S100, the abnormality detection unit 111 collects operating status information on its own control device, such as a memory, input/output data, changes in the processing contents and the like, and the operating status information of the other devices via the in-vehicle network 400 and confirms the operating status of each device. Then, it is determined whether or not abnormality information indicating the occurrence of abnormality is included in the collected operating status information, and thus the presence or absence of an abnormality is determined (step S110).

In the above condition, when the above-described security attack is received, since the contents of Functional element 3 has been falsified, the abnormality information indicating that the processing contents has been changed owing to the falsification is collected, the abnormality is detected ("Yes" in step S110), and the processing proceeds to step S120. Further, on the basis of the abnormality information, it is determined that the abnormality is caused by the security attack ("Yes" in step S120), and the processing proceeds to step S130. Note that the determination of the falsification may also be made by the comparison with the contents of Backup functional element 3B but is not limited to this.

With respect to Functional element 3 identified to be abnormal, the abnormality related location identifying unit 113 identifies functional elements i (abnormality related locations) related to the abnormality (step S130). Here, the data recorded in the execution order recording unit 150 is used for an analysis on the ADAS control device 100, and the functional elements that are executed before and after Functional element 3 executed fourthly and are recorded in the execution order recording unit 150 are confirmed. Here, if the immediately preceding three and the immediately following one are targets to be identified, the immediately preceding Functional element 1, Functional element 6, Functional element 4, and the immediately following Functional element 1 recorded as the execution order are applicable, and these are identified as the functional elements i related to the abnormality. At this time, the range up to the preceding one and the following one may be determined in advance, but the range may be set up to the point where a certain condition is satisfied, such as a point tracing up to the input of data that is likely to be an entrance of a security attack.

On the other hand, the function usage status confirming unit 114 collects information on the usage statuses of the functions corresponding to the vehicle operation, the vehicle control, the vehicle state, or the surface state of a traveling road (step S140). If it is determined that the operation frequency of the function (Functional element 6 and Functional element 7) related to the steering operation among the functional elements i is higher than that of the other functions (common functions in this case), the priority order assigning unit 115 assigns priority higher than that of Functional element 1, Functional element 3, and Functional element 4 to Functional element 6. As for Functional element 1, Functional element 3, and Functional element 4, since they are the common functions, a predetermined priority order is assigned as follows: Functional element 1>Functional element 3>Functional element 4 (step S150).

Next, the functional element switching unit 116 stops Functional element 1, Functional element 3, Functional element 4, and Functional element 6 identified as the abnormality related locations (step S160). As for the other functional elements i, the processing is continued as before.

Subsequently, the countermeasure changing unit 117 changes the countermeasure function managed by the security countermeasure unit 130 in order to increase the resistance to the security attack (step S170). In this case, since the security attack occurs via communication, the security resistance is improved by increasing the MAC length of the communication authentication function 131 as a security countermeasure for communication. Further, the switching of the security countermeasure function is notified to each device in the vehicle such as the EPS control device 200 and the brake control device 300 through the transmission/reception unit 140.

The functional element switching unit 116 activates the backup functional elements iB corresponding to the stopped functional elements i on the basis of the priority order assigned in step S150 (step S180). In this case, since the priority of Functional element 6 related to steering is high, the activation process of Backup functional element 6B of Functional element 6 is preferentially performed, and then Backup unction element 1B, Backup functional element 3B, and Backup functional element 4B for Functional element 1, Functional element 3, and Functional element 4 as common functions are activated, respectively.

As described above, in the control device (ADAS control device 100) or the control method according to Embodiment 1, even when the relationship between an attack target and a functional element related to the attack target is unknown because of an unknown security attack, the abnormality related locations are to be identified from the execution order of the functional elements i. That is, when an abnormality occurs in Functional element 3 and even if there is no prior analysis data as to which functional elements are to be the abnormality related locations, according to the processing flow shown in FIG. 2, it is determined that the execution order of Functional element 1, Functional element 4, and Functional element 6 are close and operations are similar, and they are identified as the abnormality related locations. Then, by switching to Backup functional element 1B. Backup functional element 3B, Backup functional element 4B, and Backup functional element 6B having functions equivalent to those of the identified abnormality related locations, the vehicle control equivalent to that before the attack can be continued.

In the security attack on the running control of a vehicle, "changing the method of processing" is the basic attack contents. Therefore, by identifying the abnormality related locations on the basis of the processing order, even if the security attack is an unknown attack and an abnormality to be generated by the attack and the related functional elements from the abnormality cannot be identified beforehand, the functions related to the abnormality can be accurately identified.

Further, since the activating (switching) process is performed from the functional element first with high priority (Backup functional element 6B) on the basis of the priority in consideration of the usage statuses of the functional elements i in the vehicle, there is no unharmonious feeing about the operations before and after the attack. Further, even if the same attack as that of the functional element i is planted in Backup functional element iB that is activated, the attack can be avoided because the security resistance is improved by changing the MAC length of the communication authentication function 131 of the security countermeasure unit 130.

In addition, since the change of the security countermeasure is also notified to the related control devices, the influence of the change of the security countermeasure on the vehicle can be suppressed. Note that, in Embodiment 1, the communication authentication function 131, the device authentication function 132, and the encryption function 133 are described as the security countermeasure unit 130, but this is not a limitation.

Furthermore, a functional element rewriting unit may be provided in the abnormality response control unit 110 to construct the stopped functional element i as a new backup functional element IBa by overwriting the contents of the backup functional element iB on the functional element i stopped due to the occurrence of an abnormality. In this way, against a security attack after the switching of the functions, the security resistance against the security attack can be further improved by providing backups for the functional elements.

Embodiment 2

In the control device of the vehicle system according to Embodiment 1 above, an example in which functional elements identified as the abnormality related locations are stopped upon an attack has been described. In a control device of the vehicle system according to Embodiment 2, an example will be described in which not only the functional elements identified as the abnormality related locations are stopped, but also the functional elements are held isolated so that they can be used for analyzing the security attack.

Figure 4:
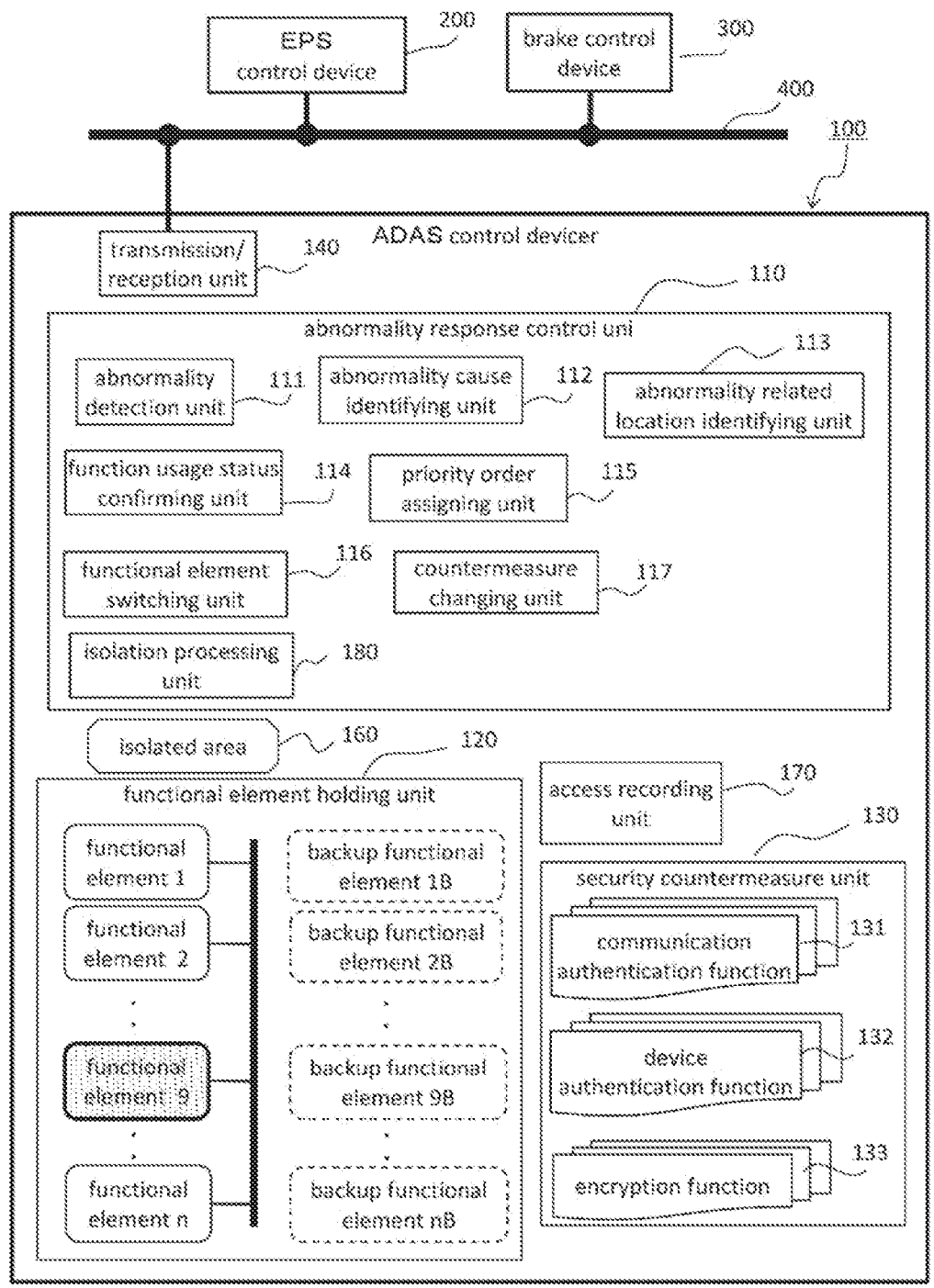
FIG. 4 is a block diagram for explaining a configuration of a control device according to Embodiment 2.
Figure 5A:
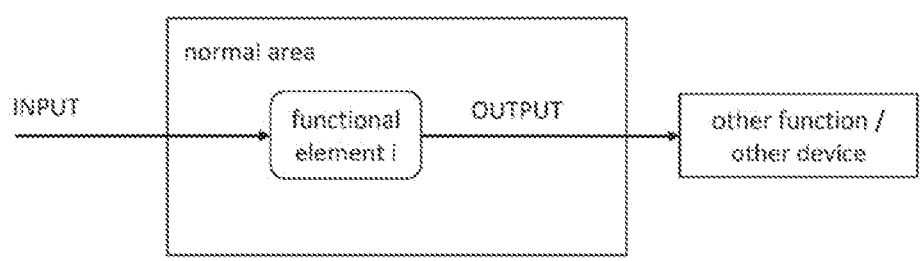
FIG. 5A and FIG. 5B are block diagrams showing respective input/output statuses for functional elements in the normal state and functional elements moved to an isolated area for explaining the isolated area in the configuration of the control device according to Embodiment 2.
Figure 5B:
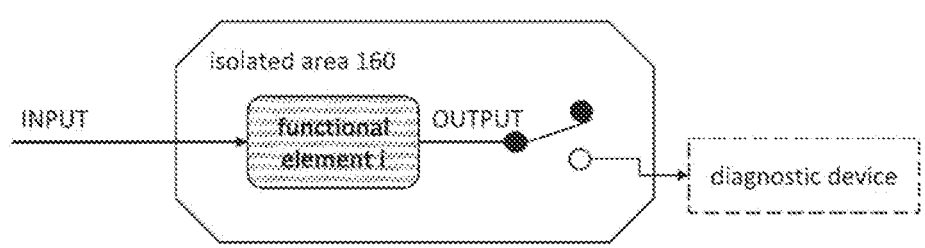
Figure 6:
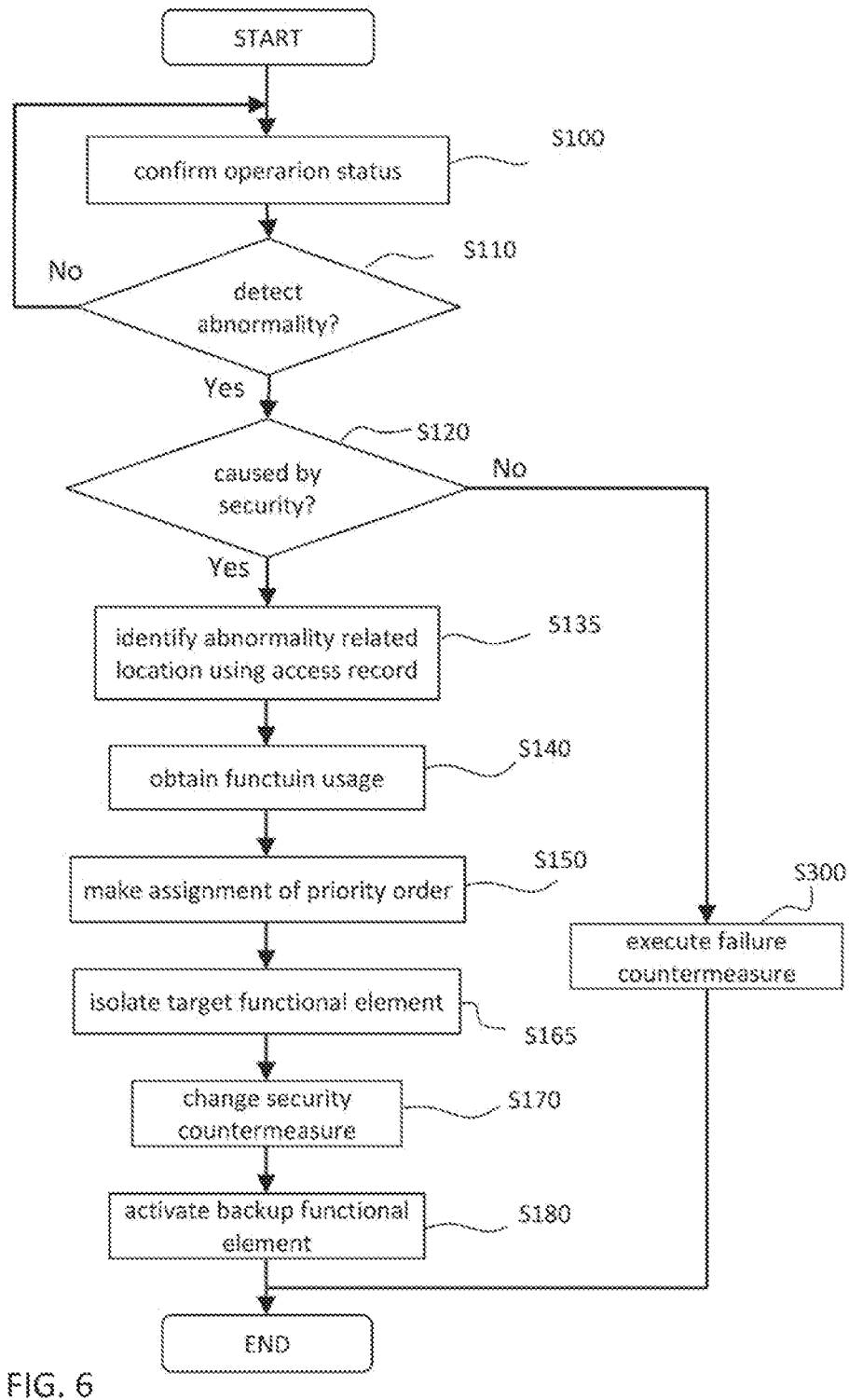
FIG. 6 is a flowchart for explaining operations of the control device according to Embodiment 2.
Figure 7:
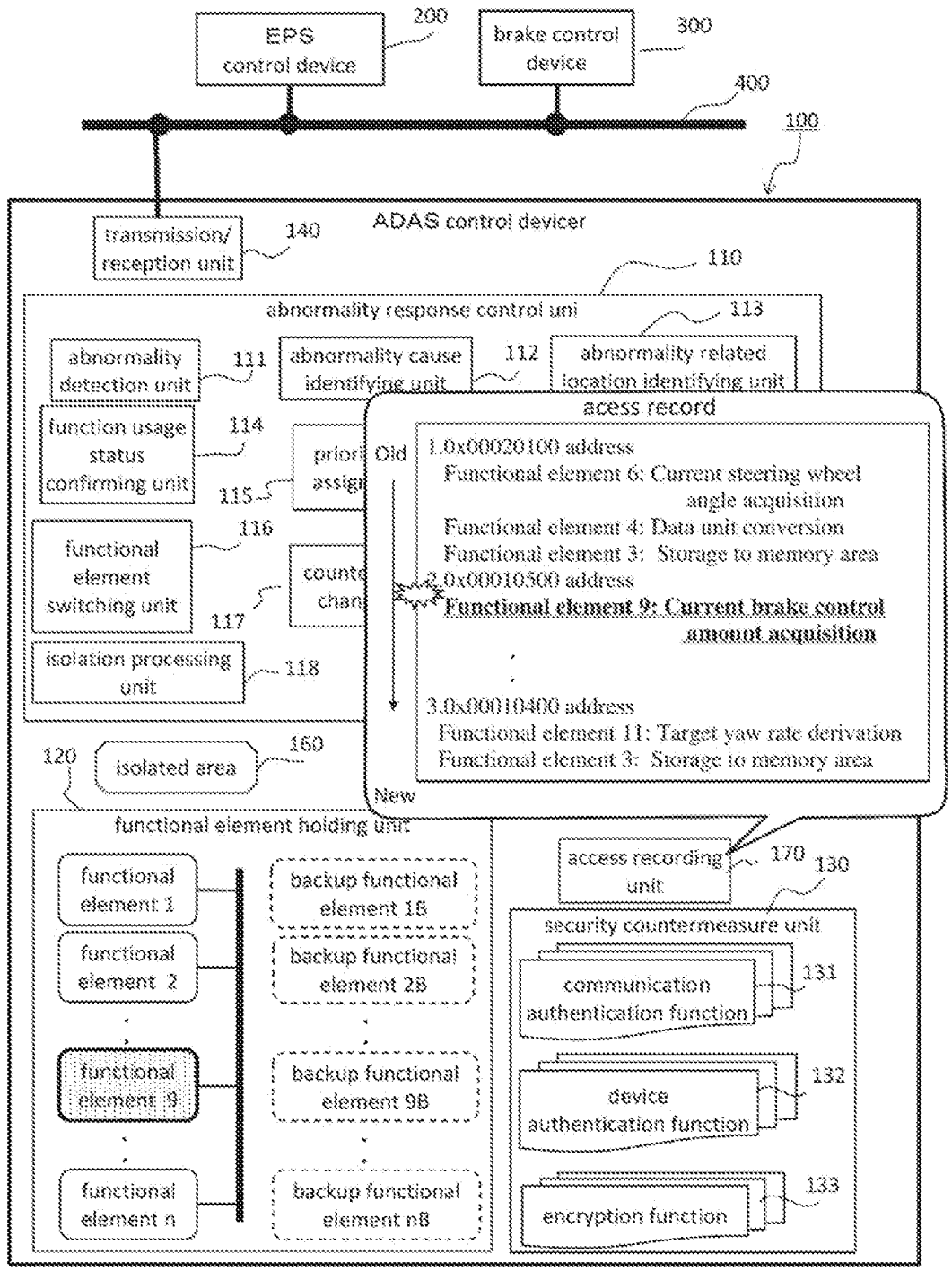
FIG. 7 is a block diagram showing a functional element in which an abnormality has occurred in the configuration of the control device according to Embodiment 2.

FIG. 4 to FIG. 7 are diagrams for explaining a configuration and operations of the control device according to Embodiment 2, FIG. 4 is a block diagram of the control device in which a connection with other control devices via a communication path is included in the configuration of the control device, and FIG. 5A and FIG. 5B includes block diagrams for explaining an isolated area and FIG. 5A shows an input/output state with respect to a certain functional element in a normal state and FIG. 5B shows an input/output state with respect to a functional element moved to the isolated area. FIG. 6 is a flowchart for explaining countermeasure operations, namely, a control method when a security attack is received, and FIG. 7 is a block diagram, which corresponds to FIG. 4, for showing a functional element in which an abnormality has occurred for identifying abnormality related locations among a plurality of functional elements held in the functional element holding unit of the control device, and for showing recorded contents of the access recording unit. Note that, in Embodiment 2, components identical or corresponding to those in Embodiment 1 are denoted by the same reference numerals, and repetitive descriptions thereof are omitted.

In the vehicle control system according to Embodiment 2, as in Embodiment 1, the ADAS control device 100, the EPS control device 200, and the brake control device 300 are connected to each other via the in-vehicle network 400. Meanwhile, as shown in FIG. 4, the difference in Embodiment 2 is such that, in addition to the configuration described with reference to FIG. 1, the ADAS control device 100 newly includes an isolation processing unit 118 and an isolated area 160 and includes an access recording unit 170 instead of the execution order recording unit 150. Further, for example, since the configuration other than the configuration relating to operations of the isolation processing unit 118 like the functional element switching unit 116 and the configuration relating to the determination of a similarity for identifying the abnormality related locations is basically the same as that in Embodiment 1, the description thereof is omitted here.

First, with regard to the configuration and functions added to the ADAS control device 100 according to Embodiment 1, processing of the functional elements i identified as the abnormality related locations and the abnormality related locations will be briefly described in this order. The isolation processing unit 118 moves the functional elements i identified as the abnormality related locations when an attack is received, to the isolated area 160 so as not to affect other functional elements i with the functional elements i remained enabled. Here, the isolated area 160 is to be prepared as a memory area in which an access to other functional elements i or memory areas is restricted.

That is, as shown in FIG. 5A, when the functional element i before an attack is received is operated in a normal area, the processing of the functional element i is performed on the input and the output is transferred to another functional element i or to a control device. However, as shown in FIG. 5B, when the functional element i is moved to the isolated area 160, the same input value as that of the normal area is given, but the output is cut off so as not to affect other functional elements i or other control devices.

On the other hand, by connecting the cut off output to, for example, a diagnostic device, the operation of the functional element i causing the abnormality can be observed in a form close to the normal operation, and it can be useful for detailed analysis of the abnormality in a security attack or clarification of the intention of a person who has implemented the security attack. Here, as a method of the movement to the isolated area 160, there is a method of copying the functional element to the isolated area 160 to which the same memory address is virtually given and deleting the original functional element i, etc. but the method is not limited to this.

Further, when the cause of the abnormality is determined to be a security attack, the abnormality related location identifying unit 113 in Embodiment 2 identifies functional elements i related to the abnormality from an access history to the memory area by the functional elements i recorded in the access recording unit 170. Here, the similarity is determined from the proximity of the access destination (address of memory area) recorded in the access recording unit 170 when the abnormality is detected, and functional elements i related to the abnormality are identified. As described above, as an analysis of the control device at the time of detecting an abnormality, the recorded access destinations to the memory area by functional elements i are confirmed and the functional elements i related to the abnormality (abnormality related locations) are identified.

The access recording unit 170 records the access to the memory area when the functional element i is operated as an operation history for determining the similarity in the functional element i. Similar to the execution order recording unit 150 described in Embodiment 1, for example, a certain amount of a memory area for the access recording is separately secured, and by sequentially overwriting the oldest one in order, the most recent contents of the access to the memory area can be recorded.

On the basis of the above-described configuration, a series of processes, namely, the control method when an abnormality is detected in the ADAS control device 100 of the vehicle control system according to Embodiment 2 will be described with reference to the flowchart of FIG. 6. Note that, in FIG. 6, the operations are the same as those described in Embodiment 1 except that step S130 is changed to step S135 and step S160 is changed to step S165 in FIG. 2 of Embodiment 1.

The abnormality detection unit 111 collects information indicating the operating statuses not only from the statuses (memory, input/output data, change in processing contents) in its own control device but also from the EPS control device 200, the brake control device 300 and the like via the in-vehicle network 400 (step S100).

Then, it is determined whether or not there is information indicating an abnormality in the collected information (step S110). If an abnormality is detected ("Yes"), the processing proceeds to step S120 to determine the type of abnormality. If no abnormality is detected ("No"), the process returns to step S100, and the collection of the operating status information is continued.

When an abnormality is detected, the abnormality cause identifying unit 112 determines whether the abnormality is caused by a failure or a security attack on the basis of the collected abnormality information (step S120). When the abnormality is caused by the failure ("No"), for example, a general failure countermeasure based on a fail safe operation is executed (step S300), and the processing ends.

In contrast, if it is determined that the abnormality is caused by the security attack ("Yes"), the abnormality related location identifying unit 113 identifies up to which functional elements i the abnormality is related (abnormality related locations) (step S135). In Embodiment 2, as will be described later, as an analysis of the control device based on the functional element i in which the abnormality is detected, using the access record to the memory area by functional elements i recorded in the access recording unit 170, whether there exists the similarity or not is determined to identify the abnormality related locations.

Further, the function usage status confirming unit 114 obtains function usage information corresponding to the vehicle operation, the vehicle control, the vehicle state, or the surface state of a traveling road, and confirms the usage statuses of the functional elements i (step S140). Here, as an operation history the usage statuses of functional elements i that are related to a function related to a steering operation, a function related to a brake operation, and a function related to common functions such as communication are confirmed. Then, the priority order assigning unit 115 makes an assignment of a priority order in accordance with the usage statuses of the functional elements i when the functions performed by the functional elements i related to the abnormality are to be restored by the backup functional elements iB. Within the same function, the priority order is assigned in advance (step S150), for example.

When the processing targets and the priority order are determined in step S135 to step S150, the functional element switching unit 116 causes the isolation processing unit 118 to move the functional elements i of the processing targets to the isolated area 160 with the functional elements i of the processing targets remained enabled (step S165), instead of stopping the functional elements i of the processing targets described in Embodiment 1. The output of the functional elements i moved to the isolated area 160, to a device inside or outside the vehicle, is cut off, and the control functions of the functional elements i of the processing targets are substantially stopped.

Subsequently, the countermeasure changing unit 117 changes the countermeasure function managed by the security countermeasure unit 130 so as to the improve security resistance (step S170). Also in Embodiment 2, an example in which the communication authentication function 131 is changed on the assumption that a security attack has been received through communication is shown. Then, by configuring an actual change target to be selected according to the type of security attack, it is expected that the security resistance will be further improved. In addition, the transmission/reception unit 140 notifies other control devices that the security countermeasure function has been switched.

However, the other control devices are not notified of the security countermeasure to be implemented only by its own control device.

Then, the functional element switching unit 116 activates the backup functional elements iB in order from the backup functional element iB corresponding to the functional element i with high priority assigned in step S150 for the functional elements i isolated in step S165, and the switching from the stopped functional elements i is performed (step S180). Thus, the processing at the time of abnormality is completed.

In the ADAS control device 100 having the above-described configuration and the basic operation (processing flow), an example of an operation when an abnormality caused by a certain security attack occurs will be described. As an abnormality caused by a security attack, as in Embodiment 1, it is assumed that an abnormality caused by falsification of Functional element 9 among the functional elements i held by the functional element holding unit 120 due to a security attack via the in-vehicle network 400 is detected as shown in FIG. 7.

In step S100, the abnormality detection unit 111 collects the operating status information in its own control device, such as a memory, input/output data, changes in the processing contents and the like, and the operating status information of the other devices via the in-vehicle network 400 and confirms the operating status of each device.

In the above condition, when the above-described security attack is received, since the contents of Functional element 9 has been falsified, abnormality information indicating that the processing contents has been changed owing to the falsification is collected, the abnormality is detected ("Yes" in step S110), and the processing proceeds to step S120. Further, on the basis of the abnormality information, it is determined that the abnormality is caused by the security attack ("Yes" in step S120), and the processing proceeds to step S130. Note that, as in Embodiment 1, the determination of the falsification may also be made by the comparison with the contents of Backup functional element 9B but is not limited to this.

With respect to Functional element 9 identified as abnormal, the abnormality related location identifying unit 113 identifies functional elements i (abnormality related locations) related to the abnormality (step S135). Here, the data recorded in the access recording unit 170 is used for the analysis on the ADAS control device 100, and the area accessed by Functional element 9 (here, the second 0x00010500 address in the recorded data) and functional elements i that accessed areas close to the area are checked.

Here, if the closest area (address) as an area is set as a specific target, since the k-th address 0x00010400 in the recorded data is the closest area, Functional element 11 and Functional element 3 in that area are applicable, and Functional element 3 in the same address as Functional element 9 identified as abnormal is identified as the abnormality related location. Note that the range covering the proximity in which the determination on the presence of the similarity is made may be determined in advance but is not limited to the range.

On the other hand, the function usage status confirming unit 114 collects information on the usage statuses of the functions corresponding to the vehicle operation, the vehicle control, the vehicle state, or the surface state of a traveling road (step S140). Then, if it is determined that the operation frequency of the function relating to the brake operation (Functional element 9) is higher than that of the function relating to the steering operation (Functional element 11) among the functional elements i, the priority order assigning unit 115 assigns Functional element 9 a higher priority than Functional element 11. Note that the control function of Functional element 3 is not directly related to the vehicle control, i. e., "storage in the memory area", and may be set to be the lowest priority or to be excluded from the specific target of the abnormality related location, and here it is to be excluded from the specific target.

Next, instead of the stop processing by the functional element switching unit 116, the isolation processing unit 118 moves and isolates Functional element 9 identified as the abnormality occurrence source and Functional element 11 identified as the abnormality related location to the isolated area 160 (step S165). On the other hand, with respect to the other functional elements i, the processing as that in Embodiment 1 is continued as before.

As in Embodiment 1, the countermeasure changing unit 117 changes the countermeasure function managed by the security countermeasure unit 130 in order to increase the resistance to the security attack (step S170). Also in this case, since the security attack occurs via communication, the security resistance is improved by increasing the MAC length of the communication authentication function 131 as a security countermeasure for communication. Further, the switching of the security countermeasure function is notified to each device in the vehicle such as the EPS control device 200 and the brake control device 300 through the transmission/reception unit 140.

The functional element switching unit 116 activates the backup functional elements iB corresponding to the stopped functional elements i on the basis of the priority order assigned in step S150 (step S180). In this case, since the priority order of Functional element 9 implementing the function related to the brake operation is high, the activation process of Backup functional element 9B of Functional element 9 is preferentially performed, and then Backup functional element 11B of Functional element 11 implementing the function related to the steering operation is activated.

As described above, in Embodiment 2, even when the relationship between an attack target and a functional element related to the attack target is unknown because of an unknown security attack, the abnormality related location is identified from the proximity of the access destination when the functional element i operates. Therefore, even if an abnormality occurs in Functional element 9 and Functional element 11 is related to the abnormality, the vehicle control equivalent to that before the attack can be continued by switching to Backup functional element 9B and Backup functional element 11B having equivalent functions according to the processing flow shown in FIG. 6.

At this time, since the activating (switching) process is performed from the functional element first with high priority (Backup functional element 9B) on the basis of the priority in consideration of the usage statuses of the functional elements i in the vehicle, there is no unharmonious feeling about the operation before and after the attack. Further, even if the same attack as that of the functional element i is planted in Backup functional element iB that is activated, the attack can be avoided because the security resistance is improved by changing the MAC length of the communication authentication function 131 of the security countermeasure unit 130.

In particular, according to the control device (ADAS control device 100) in Embodiment 2, when an abnormality caused by a security attack occurs, the functional elements i identified as the processing targets are isolated with their functions remained enabled, and the control is switched to backup functional elements to continue the same control. Therefore, it can be useful for detailed analysis of the abnormality in the security attack or clarification of the intention of a person who implemented the security attack. It also leads to preservation of evidence (state preservation) for the security attack that has been received.

In addition, since the change of the security countermeasure is also notified to the related control devices, the influence of the change of the security measure on the vehicle can be suppressed. Note that, also in Embodiment 2, the communication authentication function 131, the device authentication function 132, and the encryption function 133 are described as the security countermeasure unit 130, but this is not a limitation. For example, if a security attack that may occur in a vehicle is analyzed in advance and a security countermeasure unit for dealing with the security attack and a procedure for strengthening the security are prepared, the resistance against the security attack can be improved. In addition, by storing a security countermeasure and backup functional elements in a memory area with a stronger guard against an access from outside, it is possible to improve the security resistance against a security attack.

Furthermore, also in Embodiment 2, a functional element rewriting unit may be provided in which the contents of the backup functional elements iB before the attack is received is overwritten on the functional elements i stopped due to the occurrence of the abnormality, thereby constructing the stopped functional elements i as new backup functional elements 1B$^+$. In this way, the security resistance against the security attack after the switching of the functions can be further improved by providing the backup of the functional elements i against the security attack.

Figure 8:
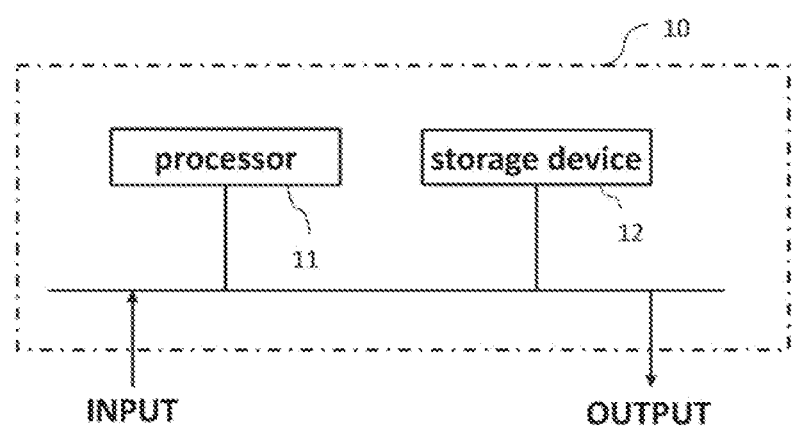
FIG. 8 is a block diagram showing a configuration example of a part for executing arithmetic processing of the control device according to each embodiment.

Note that, in the control device (ADAS control device 100) according to each embodiment described above, a part for performing arithmetic processing, in particular, each functional element i may be configured by one piece of hardware 10 including a processor 11 and a storage device 12 as shown in FIG. 8. Although not shown, the storage device 12 includes a volatile storage device such as a random access memory and a non-volatile auxiliary storage device such as a flash memory. Further, an auxiliary storage device of a hard disk may be provided instead of the flash memory. The processor 11 executes a program input from the storage device 12. In this case, the program is input from the auxiliary storage device to the processor 11 via the volatile storage device. Further, the processor 11 may output data such as the calculation result to the volatile storage device of the storage device 12 or may store the data in the auxiliary storage device via the volatile storage device.

Note that, although exemplary embodiments are described in the present application, various features, aspects, and functions described in the embodiments are not inherent in a particular embodiment and can be applicable alone or in their various combinations to each embodiment. Accordingly, countless variations that are not illustrated are envisaged within the scope of the art disclosed herein. For example, the case where at least one component is modified, added or omitted is included.

In particular, the identification of the related functional elements based on the proximity (similarity) of the access destination and the isolation processing to the isolated area 160 disclosed in Embodiment 2 can be applied separately and may be combined with the identification of the related functional elements based on the proximity (similarity) of the execution order disclosed in Embodiment 1. Furthermore, an index for determining whether or not the similarity exists is not limited to the proximity of the memory area, but may be determined, for example, by the proximity of the communication path.

In addition, the control device disclosed in the present application has been described as the ADAS control device 100 of the vehicle control system but is not limited to this. For example, as long as a system including a control device controlled by an ECU, any control device thereof can be used for a verification unit of a memory area at startup. On the other hand, in a system such as a vehicle in which the operating status of the device changes every moment, it is desirable to assign a priority order for the recovery of functional elements according to the statuses among the functional elements i that have been abnormal, and the configuration of the present application in which the priority order is assigned in accordance with the function usage statuses is suitable for the vehicle control system.

As described above, according to the control device (ADAS control device 100) in each embodiment, the control device for controlling devices installed in the vehicle (e.g., EPS control device 200, brake control device 300, or other devices in the vehicle) via a communication network (in-vehicle network 400) includes the functional element holding unit 120 to hold the plurality of functional elements i for executing the control and the backup functional elements iB that correspond to the plurality of respective functional elements i and are capable of executing the same control as the respective functional elements i, the abnormality detection unit 111 to detect an abnormality caused by a security attack via the communication network (in-vehicle network 400), the processing target identifying unit (abnormality cause identifying unit 112, abnormality related location identifying unit 113) to identify, as the processing targets, a functional element i in which the abnormality is detected and a related functional element related to the abnormality among the plurality of functional elements i when the abnormality is detected, and the functional element switching unit 116 to switch control functions of the functional elements i identified as the processing targets to corresponding respective backup functional elements iB to cause an execution. The processing target identifying unit (abnormality related location identifying unit 113) is configured to extract, as the related functional element, a functional element i that is determined to have an operating status having a similarity to that of the functional element i in which the abnormality is detected based on the operation history of the plurality of functional elements i. Therefore, even if an unknown security attack that is difficult to be analyzed in advance is received, a functional element i that may cause an abnormality can be estimated and switched to a backup functional element iB, so that vehicle control can be continued without any problems.

The execution order recording unit 150 is provided to record, as the operation history, the order in which the plurality of functional elements i are executed, and when the processing target identification unit (abnormality related location identifying unit 113) is configured to determine that a functional element i whose execution order is close to that of the functional element i in which the abnormality is detected has the similarity, and then even if a security attack that has not been analyzed is received, a functional element i that may substantially cause an abnormality can be identified, and a countermeasure can be taken.

The access recording unit 170 is provided to record, as the operation history, an access to a memory area when the plurality of functional elements i are operated, and when the processing target identification unit (abnormality related location identifying unit 113) is configured to determine that the functional element i having accessed a memory area close to the memory area accessed by the functional element i in which the abnormality is detected has the similarity, then it is possible to identify and take countermeasure for functional elements i that have been subject to an unanalyzed security attack and may have been rewritten, etc., even though superficially there appears to have no abnormality.

The priority order assigning unit 115 is provided to assign the priority order for activation to the backup functional elements iB in the switching in accordance with the usage statuses of the plurality of functional elements, and the functional element switching unit 116 is configured to activate the backup functional elements iB corresponding to the identified functional elements i based on the priority order, so that vehicle control can be continued without any problems in the same way as before the attack is received even if a security attack is received.

When the security countermeasure unit 130 is configured to be provided to change the security countermeasure for the communication network (in-vehicle network 400) depending on the type of a security attack when an abnormality is detected, in particular, even if the backup functional element iB, which has the same structure as the functional element i, is subject to the same security attack that affected the functional element i, the improved resistance can prevent the backup functional element iB from being affected.

In addition, when the isolation processing unit 118 is provided to move each of the identified functional elements i to the isolated area 160 in which inputs to the identified functional elements are maintained and outputs to an outside are cut off, it is possible to analyze a security attack and the intention of an attacker, etc.

When the functional element rewriting unit is provided to rewrite, after disabling the identified functional elements i, contents of the disabled functional elements i to the contents of the corresponding backup functional elements iB to hold resulting functional elements in the functional element holding unit 120 as backup functional elements iBa for the backup functional elements iB after the switching, it is also possible to deal with subsequent security attacks.

As described above, according to the control method in each of the embodiments, the control method of controlling the devices (e.g., EPS control device 200, brake control device 300 or other devices in the vehicle) mounted in a vehicle via a communication network (in-vehicle network 400) includes the functional element holding step of holding the plurality of functional elements i for executing the control and the backup functional elements iB that correspond to the plurality of respective functional elements i and are capable of executing the same control as the respective functional elements i, the abnormality detecting step (step S100 to step S120) of detecting an abnormality caused by a security attack via the communication network (in-vehicle network 400), the processing target identifying step (step S130 or step S135) of identifying, as the processing targets, the functional element i in which the abnormality is detected and the related functional element related to the abnormality among the plurality of functional elements i when the abnormality is detected, and the functional element switching step (step S160 or step S165, and step S170 to step S180) of switching control functions of the functional elements i identified as the processing targets to corresponding respective backup functional elements iB to cause an execution. In the processing target identifying step (step S130 or step S135), it is configured that the functional element i that is determined to have an operating status having the similarity to that of the functional element i in which the abnormality is detected is extracted as the related functional element based on the operation history (operation order, access record) of the plurality of functional elements i. Therefore, even if an unknown security attack that is difficult to be analyzed in advance is received, a functional element i that may cause an abnormality can be estimated and switched to a backup functional element iB, so that vehicle control can be continued without any problems.

The execution order recording step of recording, as the operation history, an order in which the plurality of functional elements i are executed is provided, and in the processing target identifying step (step S130), when it is configured that a functional element i whose execution order is close to that of the functional element i in which the abnormality is detected is determined to have the similarity and even if a security attack that has not been analyzed is received, a functional element i that may substantially cause an abnormality can be identified, and a countermeasure can be taken.

The access recording step of recording, as the operation history, an access to a memory area when the plurality of functional elements i are operated is provided, and in the processing target identifying step (step S135), when it is configured that a functional element i having accessed a memory area close to the memory area accessed by the functional element i in which the abnormality is detected is determined to have the similarity, it is possible to identify and take countermeasure for functional elements i that have been subject to an unanalyzed security attack and may have been rewritten, etc., even though superficially there appears to have no abnormality.

The priority assigning step of assigning a priority order for activation to backup functional elements iB in the switching in accordance with usage statuses of the plurality of functional elements i is provided (step S150), and in the functional element switching step (step S160 or step S165, and step S170 to step S180), when it is configured that the backup functional elements iB corresponding to the identified functional elements i are activated based on the priority order, the vehicle control can be continued without any problems in the same way as before the attack is received even if a security attack is received.

When it is configured that the security countermeasure step (step S170) is provided in which a security countermeasure for the communication network (in-vehicle network 400) is changed depending on a type of the security attack before the switching of the control functions of the identified functional elements i in the functional element switching step, in particular, even if the backup functional element iB, which has the same structure as the functional element i, is subject to the same security attack that affected the functional element i, the improved resistance can prevent the backup functional element iB from being affected.

DESCRIPTION OF REFERENCE NUMERALS AND SIGNS

100: ADAS control device (control device), 110: abnormality response control unit, 111: abnormality detection unit, 112: abnormality cause identifying unit (processing target identifying unit), 113: abnormality related location identification unit (processing target identifying unit), 114: function usage status confirming unit, 115: priority order assigning unit, 116: functional element switching unit, 117: countermeasure changing unit, 118: isolation processing unit, 120: functional element holding unit, 130: security countermeasure unit, 131: communication authentication function, 132: device authentication function, 133: encryption function, 140: transmission/reception unit, 150: execution order recording unit, 160: isolated area, 170: access recording unit, 200: EPS control device, 300: brake control device. 400: in-vehicle network (communication network), i: functional element, iB: backup functional element, iBa: backup functional element.

The invention claimed is:

1. A control method of controlling a device mounted in a vehicle via a communication network, the control method comprising:
 a functional element holding step of holding a plurality of functional elements for executing the control and also backup functional elements that correspond to the plurality of respective functional elements and are capable of executing the same control as the respective functional elements;
 an abnormality detecting step of detecting an abnormality caused by a security attack via the communication network;
 a processing target identifying step of identifying, as processing targets, a functional element in which the abnormality is detected and a related functional element related to the abnormality among the plurality of functional elements when the abnormality is detected; and
 a functional element switching step of switching control functions of the functional elements identified as the processing targets to corresponding respective backup functional elements, wherein
 in the processing target identifying step, a functional element that is determined to have an operating status having a similarity to that of the functional element in which the abnormality is detected is extracted as the related functional element based on an operation history of the plurality of functional elements.

2. The control method according to claim 1, further comprising an execution order recording step of recording, as the operation history, an order in which the plurality of functional elements are executed wherein
 in the processing target identifying step, a functional element whose execution order is close to that of the functional element in which the abnormality is detected is determined to have the similarity.

3. The control method according to claim 1, further comprising an access recording step of recording, as the operation history, an access to a memory area when the plurality of functional elements are executed, wherein
 in the processing target identifying step, a functional element having accessed a memory area close to a memory area accessed by the functional element in which the abnormality is detected is determined to have the similarity.

4. The control method according to claim 1, further comprising a priority assigning step of assigning a priority order for activation to backup functional elements in the switching in accordance with usage statuses of the plurality of functional elements, wherein
 in the functional element switching step, backup functional elements corresponding to the identified functional elements are activated based on the priority order.

5. The control method according to claim 1, further comprising a security countermeasure step of changing a security countermeasure for the communication network depending on a type of the security attack before the switching of control functions of the identified functional elements in the functional element switching step.

6. A control device for controlling a device mounted in a vehicle via a communication network, the control device comprising:
 a functional element holder to hold a plurality of functional elements for executing the control and also backup functional elements that correspond to the plurality of respective functional elements and are capable of executing the same control as the respective functional elements;
 an abnormality detector to detect an abnormality caused by a security attack via the communication network;
 a processing target identifying circuitry to identify, as processing targets, a functional element in which the abnormality is detected and a related functional element related to the abnormality among the plurality of functional elements when the abnormality is detected; and
 a functional element switcher to switch control functions of the functional elements identified as the processing targets to corresponding respective backup functional elements, wherein
 the processing target identifying circuitry extracts, as the related functional element, a functional element that is determined to have an operating status having a similarity to that of the functional element in which the abnormality is detected based on an operation history of the plurality of functional elements.

7. The control device according to claim 6, further comprising an execution order recorder to record, as the operation history, an order in which the plurality of functional elements are executed, wherein
 the processing target identifying circuitry determines that a functional element whose execution order is close to that of the functional element in which the abnormality is detected has the similarity.

8. The control device according to claim 7, further comprising an access recorder to record, as the operation history, an access to a memory area when the plurality of functional elements are operated, wherein
 the processing target identifying circuitry determines that a functional element having accessed a memory area close to a memory area accessed by the functional element in which the abnormality is detected has the similarity.

9. The control device according to claim 7, further comprising a priority order assigning circuitry to assign a priority order for activation to the backup functional elements in the switching in accordance with usage statuses of the plurality of functional elements, wherein
 the functional element switcher activates the backup functional elements corresponding to the identified functional elements based on the priority order.

10. The control device according to claim 7, further comprising a security countermeasure circuitry to change a security countermeasure for the communication network depending on a type of the security attack when the abnormality is detected.

11. The control device according to claim 7, further comprising an isolation processor to move each of the identified functional elements to an isolated area in which inputs to the identified functional elements are maintained and outputs to an outside are cut off.

12. The control device according to claim 7, further comprising a functional element rewriter to rewrite, after disabling the identified functional elements, contents of the disabled functional elements to contents of the corresponding backup functional elements to hold resulting functional elements in the functional element holder as backup functional elements for the backup functional elements after the switching.

13. The control device according to claim 6, further comprising an access recorder to record, as the operation history, an access to a memory area when the plurality of functional elements are operated, wherein
the processing target identifying circuitry determines that a functional element having accessed a memory area close to a memory area accessed by the functional element in which the abnormality is detected has the similarity.

14. The control device according to claim 13, further comprising a priority order assigning circuitry to assign a priority order for activation to the backup functional elements in the switching in accordance with usage statuses of the plurality of functional elements, wherein
the functional element switcher activates the backup functional elements corresponding to the identified functional elements based on the priority order.

15. The control device according to claim 13, further comprising a security countermeasure circuitry to change a security countermeasure for the communication network depending on a type of the security attack when the abnormality is detected.

16. The control device according to claim 13, further comprising an isolation processor to move each of the identified functional elements to an isolated area in which inputs to the identified functional elements are maintained and outputs to an outside are cut off.

17. The control device according to claim 6, further comprising a priority order assigning circuitry to assign a priority order for activation to the backup functional elements in the switching in accordance with usage statuses of the plurality of functional elements, wherein
the functional element switcher activates the backup functional elements corresponding to the identified functional elements based on the priority order.

18. The control device according to claim 6, further comprising a security countermeasure circuitry to change a security countermeasure for the communication network depending on a type of the security attack when the abnormality is detected.

19. The control device according to claim 6, further comprising an isolation processor to move each of the identified functional elements to an isolated area in which inputs to the identified functional elements are maintained and outputs to an outside are cut off.

20. The control device according to claim 6, further comprising a functional element rewriter to rewrite, after disabling the identified functional elements, contents of the disabled functional elements to contents of the corresponding backup functional elements to hold resulting functional elements in the functional element holder as backup functional elements for the backup functional elements after the switching.

\* \* \* \* \*